United States Patent [19]
Konishi

[11] Patent Number: 5,198,763
[45] Date of Patent: Mar. 30, 1993

[54] APPARATUS FOR MONITORING THE AXIAL AND RADIAL WEAR ON A BEARING OF A ROTARY SHAFT

[75] Inventor: Yoshiaki Konishi, Tokyo, Japan

[73] Assignee: Nikkiso Co., Ltd., Tokyo, Japan

[21] Appl. No.: 908,546

[22] Filed: Jun. 30, 1992

Related U.S. Application Data

[63] Continuation of Ser. No. 656,282, Feb. 14, 1991, abandoned.

[30] Foreign Application Priority Data

Feb. 20, 1990 [JP] Japan ................... 2-37191

[51] Int. Cl.$^5$ .......... G01B 7/14; G01B 7/30; G01B 11/14; G01D 5/12
[52] U.S. Cl. .......... 324/207.23; 250/231.13; 324/207.14; 324/207.22; 324/207.25; 356/373; 384/448
[58] Field of Search .......... 324/165, 173–175, 324/207.11, 207.14–207.16, 207.22, 207.23, 207.24, 207.25, 207.26; 340/870.31; 250/231.13; 356/373, 375

[56] References Cited

U.S. PATENT DOCUMENTS

| | | | |
|---|---|---|---|
| 3,170,112 | 2/1965 | Bungardt et al. | 324/207.25 |
| 3,307,164 | 2/1967 | Zimmer | 324/173 X |
| 3,613,000 | 10/1971 | Weir et al. | 324/207.25 X |
| 4,059,794 | 11/1977 | Furness et al. | 324/207.25 |
| 4,406,999 | 9/1983 | Ward | 340/870.31 |
| 4,764,767 | 8/1988 | Ichikawa et al. | 324/207.22 X |
| 4,833,405 | 5/1989 | Richards et al. | 324/207.25 X |

FOREIGN PATENT DOCUMENTS

| | | | |
|---|---|---|---|
| 2062875 | 5/1981 | United Kingdom | 324/207.25 |
| 2221306 | 1/1990 | United Kingdom | 324/207.25 |

Primary Examiner—Gerard R. Strecker
Attorney, Agent, or Firm—Young & Thompson

[57] ABSTRACT

Apparatus for monitoring the axial and radial wear on a bearing of a rotary shaft, comprising a slide bearing supporting the shaft for axial movement parallel to an axis of rotation of the shaft in the bearing, and a detector to detect an axially displaced position of the rotary shaft. A detector is also provided for detecting a radially displaced position of the shaft, and the axial and radial positions of the shaft are simultaneously displayed, thereby to indicate axial and radial wear of the bearing. A detector is also provided for detecting and displaying the direction of rotation of the shaft. The device for detecting radial displacement of the shaft comprises a fixed distance detector for detecting the distance between the distance detector and the shaft.

1 Claim, 6 Drawing Sheets

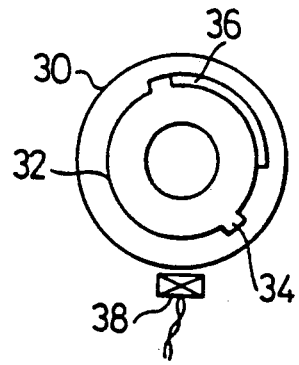
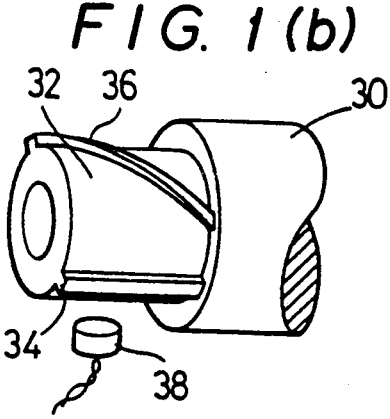
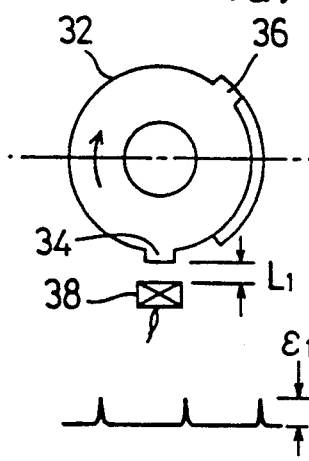
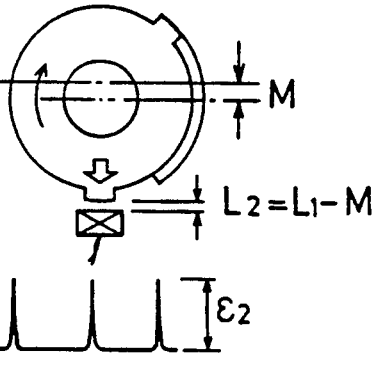
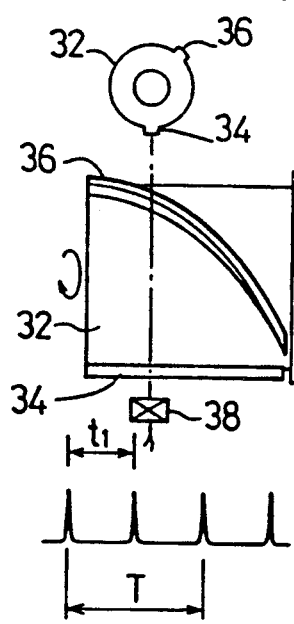
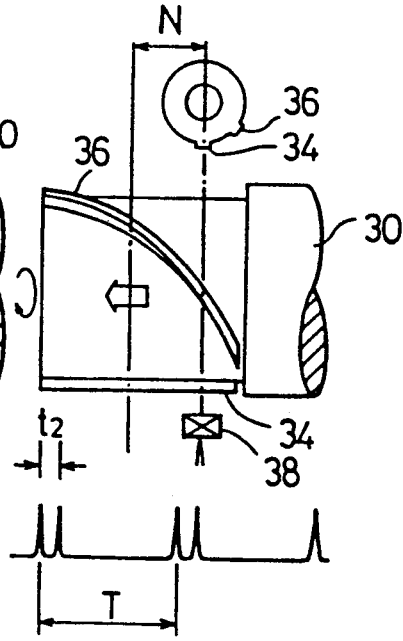

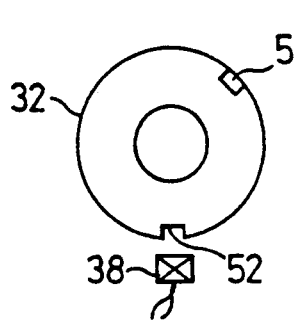
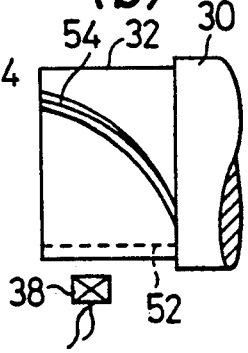
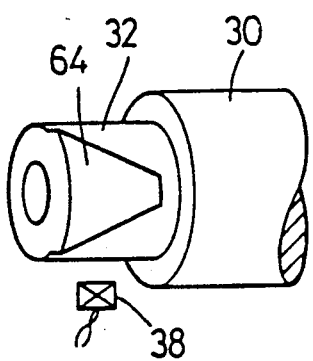
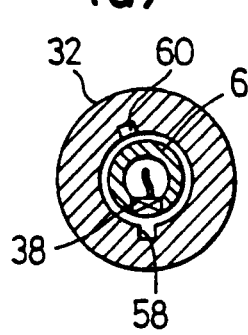
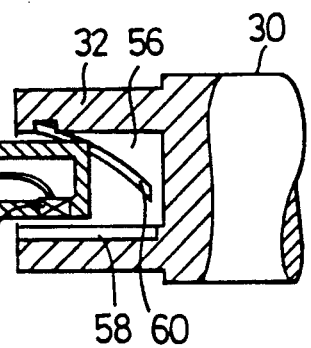
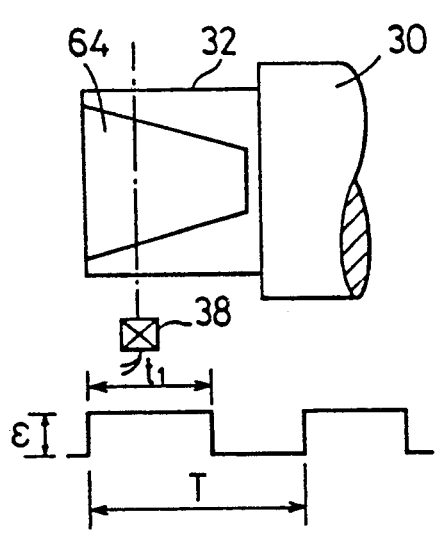
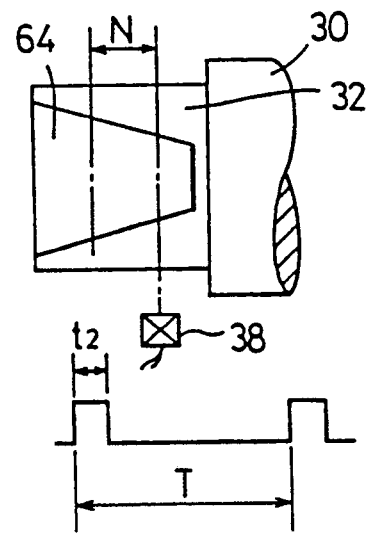

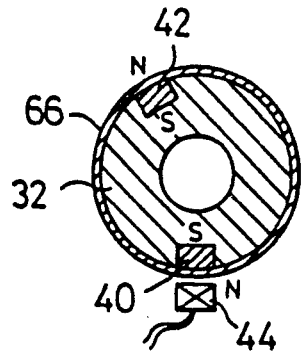
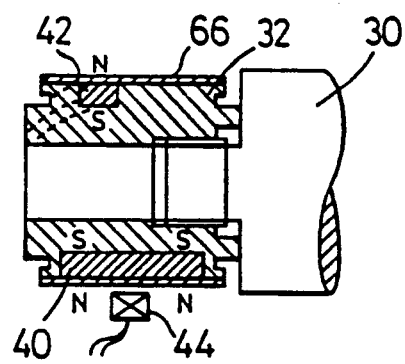
FIG.12(a)  FIG.12(b)
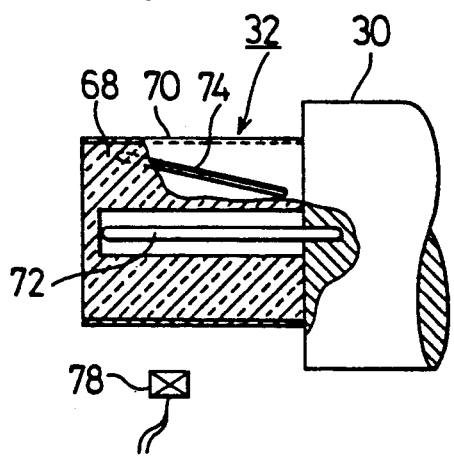
FIG.13
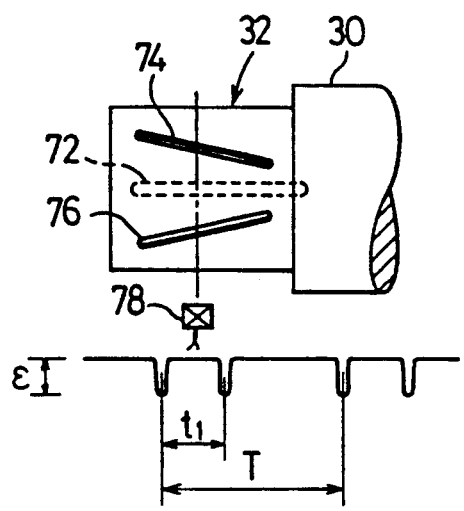
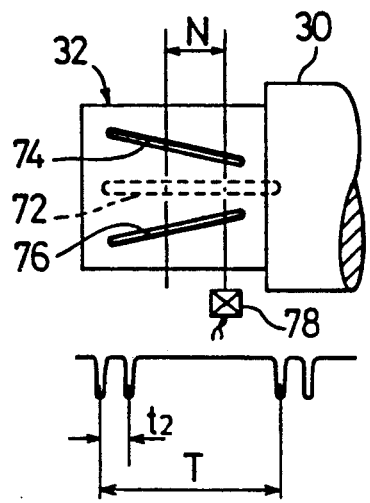
FIG.14(a)  FIG.14(b)

APPARATUS FOR MONITORING THE AXIAL AND RADIAL WEAR ON A BEARING OF A ROTARY SHAFT

This application is a continuation of application Ser. No. 07/656,282, filed Feb. 14, 1991, now abandoned.

FIELD OF THE INVENTION

This invention relates to an apparatus for monitoring abrasion of a slide bearing utilized for a canned motor pump and the like during its operation.

BACKGROUND OF THE INVENTION

In general, a canned motor pump at its rotary portion is completely immersed in a treating liquid and has not any sealing portions, so that complete non-leakage may be achieved, and thus has been recommended for use in various processing pumps. In such a type of canned motor pumps, all radial and thrust loads of the rotary portions during operation may be received by the slide bearing supporting a rotary shaft of the rotary portions. Since the bearing is immersed in the treating liquid as mentioned above, a special monitoring apparatus should be provided for monitoring abrasion of the bearing.

In the following, such a monitoring apparatus will be described briefly. The monitoring apparatus may generally be mechanical or electrical, but a mechanical embodiment of the apparatus will be described with reference to FIG. 18. The monitoring apparatus has a slide bearing 10 for supporting a canned motor shaft 12 provided at its end with an end nut 14, within a hollow portion 16 of which is arranged a sensing portion 20 of a detector 18. The sensing portion 20 is sealed under pressure therein. In such construction, radial abrasion of the bearing 10 generates an eccentric movement of the shaft 12, whereas thrust abrasion of the bearing 10 displaces the shaft 12 axially, resulting in contact (and hence breakage) of the sensing portion 20 with an inner wall or end face of the hollow portion 16. Thus, fluctuations of an inner pressure of the sensing portion 20 are sensed for detecting the limiting abrasion in the radial and thrust direction of the bearing 10. In the apparatus of an electrical construction not specifically shown, on the other hand, a plurality of coils for detecting a magnetic flux are connected in series and placed within a stator, for example. In such a construction, abrasion of the bearing causes the shaft and a rotor to rotate eccentrically, thereby to increase an electromotive force in the detecting coil for detecting the abrasion degree of the bearing.

These conventional monitoring apparatus of the bearing as described above have, however, several disadvantages and problems. Firstly, the mechanical construction may detect both the radial and thrust abrasion relating to the limiting abrasion, but not an abrasion degree leading to the limiting abrasion or a residual life. The electrical construction, on the other hand, may detect the abrasion degree of the bearing only in the radial direction, but not the thrust direction.

Further, in such type of the monitoring apparatus of the bearing, it is desirable to detect both the rotating and thrust direction of the bearing. Such detection cannot be achieved by the conventional apparatus as described above.

An object of the invention, therefore, is to provide a monitoring apparatus of a bearing which may detect not only the radial and thrust abrasion degree of the bearing but also the rotating and thrust direction of the shaft.

SUMMARY OF THE INVENTION

In order to achieve the above-mentioned object, the monitoring apparatus of the bearing according to the invention comprises a signal generating means provided on a rotary shaft, which is supported by a slide bearing, for generating a signal that varies according to an axial position of said rotary shaft, and a detecting means arranged in a position opposite to said signal generating means for receiving said signal and detecting a distance from said signal generating means.

In this case, the signal generating means may comprise irregularities formed on a portion of the rotary shaft, while the detecting means comprises a contactless distance sensor, or wherein the irregularities may comprise one or more concave groove and/or convex ridge parallel to an axis, as well as one helical concave groove or convex ridge, or wherein the irregularities may comprise a concave or convex sector portion which has an axially varying width.

Further, the signal generating means may comprise a permanent magnet provided on a surface of the rotary shaft, while the detecting means comprises a magnetic sensor; or the signal generating means may comprise a linear light source provided within a portion of the rotary shaft, while the detecting means comprises a photo-sensor; or the signal generating means may comprise a reflective plate and a light source illuminating said reflective plate, while the detecting means comprises a photo-sensor.

For better understanding, operation of the monitoring apparatus of the bearing according to the invention will be described with reference to an embodiment in which the signal generating means comprises a single convex ridge parallel to an axis and a single helical convex ridge, both said ridges being arranged in the same semi-cylindrical surface of the shaft and having different height.

At first, upon each rotation of the shaft both convex ridges pass through the nearest position from the distance sensor. Thus, two unit pulses may be generated from the distance sensor synchronously to a rotation cycle of the shaft. Since both pulse signals are set to have different amplitudes, checking the signal sequence from each pulse allows simultaneous detection of the rotating direction of the shaft.

Then, upon the radial abrasion of the bearing, the shaft is subjected to an eccentric movement proportional to the degree of abrasion, thereby to reduce the shortest distance between the ridges and the distance sensor. As a result, the amplitude of the pulse signal from the distance sensor is increased, depending on the degree of abrasion. Thus, the degree of radial abrasion of the bearing may be detected.

Upon the thrust abrasion of the bearing, on the other hand, the shaft is subjected to displacement in the axial direction proportionally to the degree of abrasion, thereby to increase or reduce a surface distance between both ridges in an axially perpendicular plane through the distance sensor. As a result, the time interval between both pulse signals from the ridges is increased or reduced, depending on the degree and direction of the bearing abrasion. Thus, the degree and direction of the thrust abrasion may be detected simultaneously.

Now, the monitoring apparatus of the bearing according to the invention will be described for its preferred embodiments in more detail with reference to the accompanying drawings.

BRIEF DESCRIPTION OF THE DRAWINGS

FIGS. 1 (a) and (b) are an end view and a perspective view, respectively, of one embodiment of the monitoring apparatus according to the invention, FIGS. 2 (a) and (b) are sectional views showing a normal state and a radial abrasion state, respectively, of the bearing in the monitoring apparatus, FIGS. 3 (a) and (b) are side views in a normal state and a thrust abrasion state of the bearing, respectively, of the monitoring apparatus as shown in FIG. 1, FIGS. 4 (a) and (b) are an end view and a perspective view, respectively, of another embodiment of the monitoring apparatus according to the invention, FIGS. 5 (a) and (b) are end views upon normal and reverse rotation, respectively, of the rotary shaft in a modified embodiment of the monitoring apparatus as shown in FIGS. 1 (a) and (b), FIG. 10 is a perspective view of a further embodiment of the monitoring apparatus according to the invention, FIGS. 11 (a) and (b) are side views upon a normal state and a thrust abrasion state, respectively, of the bearing in the monitoring apparatus as shown in FIG. 10, FIGS. 12 (a) and (b) are sectional views in a plane perpendicular to a rotation axis and in a plane through the axis, respectively, of a modified embodiment of the monitoring apparatus of FIGS. 4 (a) and (b), FIG. 13 is a sectional view taken through the rotation axis of the rotary shaft in a still further embodiment of the monitoring apparatus according to the invention, FIGS. 14 (a) and (b) are side views in a normal state and a thrust abrasion state, respectively, of the bearing of the monitoring apparatus as shown in FIG. 13.

PREFERRED EMBODIMENTS OF THE INVENTION

Figure 5A:
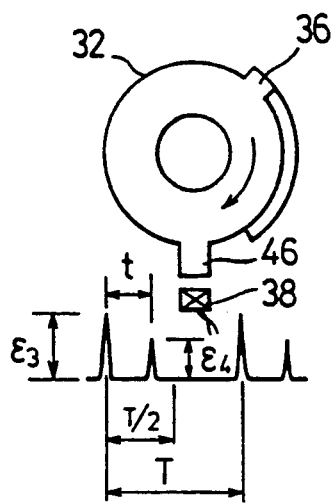

Referring to FIGS. 1 (a) and 1 (b), a monitoring apparatus according to the invention is formed on an end nut 32 which is provided at an end of a rotary shaft 30 in a canned motor pump and the like supported by a slide bearing (not shown). On a surface of the end nut 32 is arranged a signal generating means comprising a rectilinear ridge 34 parallel to an axis of the rotary shaft 30 and an axially curved helical ridge 36, while a distance sensor 38 such as a contactless displacement gauge is provided in a position opposite to the signal generating means for inputting detected signals to a signal treating device (not shown). In this case, both of the ridges 34 and 36 are arranged within the same semi-cylindrical surface of the end nut 32.

Now, the monitoring apparatus of such construction will be described for its operation. When the rotary shaft 30 (or the end nut 32) rotates, as apparent from FIG. 2 (a), both ridges 34 and 36 pass at each rotation through a nearest position $L_1$ to the distance sensor 38. Thus, from the distance sensor 38 is generated two pulse signals having an amplitued $\epsilon_1$, as illustrated, synchronously to a rotation cycle. If the bearing is subjected to radial abrasion, the rotary shaft 30 (or the end nut 32) undergoes an eccentric movement with an amplitude of M proportional to a degree of abrasion, as shown in FIG. 2 (b), the shortest distance between the ridges 34, 36 and the distance sensor 38 is reduced from $L_1$ to $L_2 = L_1 - M$. Thus, as illustrated, from the distance sensor 38 are generated pulse signals of an amplitude of $\epsilon_2$ which is increased corresponding to the degree of abrasion, thereby to allow the degree of the radial abrasion to be detected.

During rotation of the rotary shaft 30 (or the end nut 32), as described herein-above, the two pulse signals corresponding to the both ridges 34 and 36 are generated from the distance sensor 38, and a time interval $t_1$ of the signals [cf. FIG. 3 (a)] is set to a constant position within ½ of a rotation cycle T upon normal rotation, since both ridges 34 and 36 are arranged within the same semi-cylindrical surface. If the bearing is subjected to the thrust abration, the rotary shaft 30 (or end nut 32) is displaced by a distance N corresponding to the degree of abrasion, namely to the left as shown with an arrow in FIG. 3 (b). As a result, signals of a reduced time interval $t_2$ corresponding to the degree and direction of abrasion may be generated from the distance sensor 38, as shown, thereby to allow the thrust abrasion direction and its degree to be detected simultaneously. When the rotation cycle T is constant, the detection may be effected by measuring only time intervals $t_1, t_2 \ldots$ When the rotation cycle T is varied, however, a time ratio t/T should be measured for the detection.

Now, another embodiment of the monitoring apparatus according to the invention will be described with reference to FIGS. 4 (a) and (b). This embodiment is different from that of FIG. 1 in that permanent magnets are employed as the signal generating means in place of the ridges while a magnetic sensor is employed in place of the contactless distance sensor. Namely, on the surface of the end nut 32 are arranged a rectilinear permanent magnet 40 and a helical permanent magnet 42 integrally or embeddedly to form the signal generating means, while the magnetic sensor 44 comprising a Hall element or magnetic resistance element 44 is provided in a position opposite to the signal generating means for inputting detected signals to a signal treating device (not shown). According to this embodiment, it will be appreciated that the same effect as in the previous embodiment may be achieved.

Figure 5B:
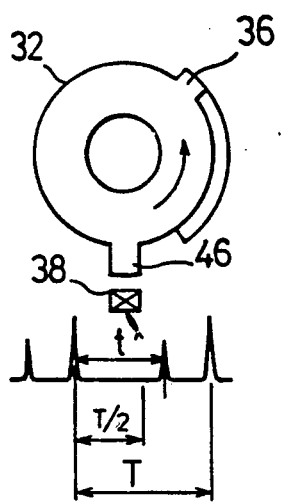

A further embodiment of FIGS. 5 (a) and (b) is different from that of FIG. 1 in that the rectilinear ridge 34 is higher than the helical ridge 36. According to such construction, the rotating direction of the rotary shaft may be readily detected in addition to the effect obtainable by the embodiment of FIG. 1. The amplitude $\epsilon_3$ of the pulse signal corresponding to the higher linear ridge 46 is set to be higher than the amplitude $\epsilon_4$ of the helical ridge 36. Assuming that the higher signal $\epsilon_3$ is the base signal and the lower signal $\epsilon_4$ is a reference signal, the measurement whether a time interval t from the signal $\epsilon_3$ to $\epsilon_4$ falls within ½ of the rotation cycle T or not may provide convenient detection of the rotating direction of the shaft clockwise [FIG. 5 (a)] or anti-clockwise [FIG. 5 (b)].

Figure 6:
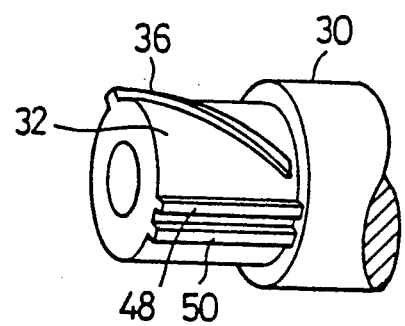
FIG. 6 is a perspective view of another modified embodiment of the monitoring apparatus as shown in FIGS. 1 (a) and (b), FIGS. 7 (a) and (b) are end views upon normal and reverse rotation, respectively, of the rotary shaft in the monitoring apparatus as shown in FIG. 6, FIGS. 8 (a) and (b) are an end view and a side view, respectively, of a further modified embodiment of the monitoring apparatus as shown in FIGS. 1 (a) and (b), FIGS. 9 (a) and (b) are cross-sectional views of a still further embodiment of the monitoring apparatus as shown in FIGS. 1 (a) and (b)
Figure 7A:
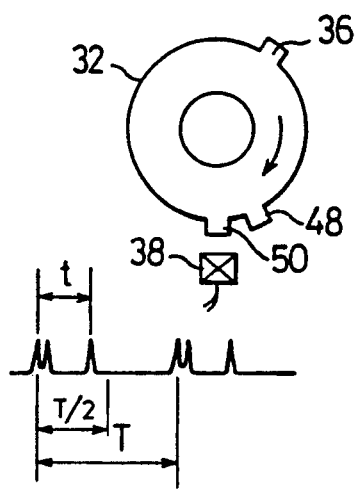
Figure 7B:
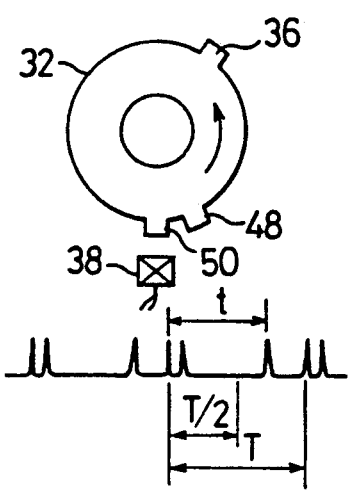

The embodiment of FIG. 6 is different from that of FIG. 1 in that the linear ridge 34 is replaced with two linear ridges 48, 50 parallel to each other. With this embodiment, as in FIGS. 5 (a) and (b), the rotating direction of the shaft may be readily detected. Referring to FIGS. 7 (a) and (b), the pulse signals corresponding to the two ridges 48, 50 are generated as a two-pulse signal (base signal), which is followed by a reference signal. The measurement whether the time interval t between the base and reference signals falls within ½ of the rotation cycle T may provide convenient detection direction of rotation of the shaft clockwise [FIG. 7 (a)] or anti-clockwise [FIG. 7 (b)].

The embodiment of FIGS. 8 (a) and (b) is different from that of FIG. 1 in that the rectilinear and helical ridges 34 and 36 are replaced with concave grooves 52 and 54, respectively. The embodiment of FIGS. 9 (a) and (b), on the other hand, is different from that of FIG. 1 in that the rectilinear and helical ridges 34 and 36 are replaced with grooves 58 and 60, respectively, formed on an inner surface of a hollow portion 56 of the end nut 32, while the distance sensor 38 is mounted in a sensor-mounting shaft 62 which is arranged concentrically to the rotary shaft 30 (or the hollow poriton 56 of the end nut 32). With the two embodiments described just above, an effect similar to that of FIG. 1 may be achieved.

The embodiment of FIG. 10 is different from that of FIG. 1 in that the rectilinear and helical ridges 34 and 36 as the signal generating means are replaced with a convex sector portion 64 having an axially varying width. With such construction, the detection of the degree of radial abrasion in the bearing may be carried out, as suggested from the embodiment of FIG. 1 as follows: when an output of the monitoring apparatus in the normal state of the bearing is in a state as shown in FIG. 11 (a), and the rotary shaft 30 is displaced by a distance N to the left, as shown in FIG. 11 (b), due to the thrust abrasion of the bearing, the pulse time t of the pulse signal from the distance sensor 38 corresponding to the sector portion 64 is reduced from $t_1$ to $t_2$. Since these pulse times $t_1$, $t_2$ ... may be varied depending on the degree and direction of the bearing abrasion, the measurement of only the pulse times $t_1$, $t_2$ ... allows the degree and the direction of the thrust abrasion to be detected, as in the embodiment of FIG. 1. If the rotation cycle T is varied, the time ration t/T should be measured for the detection. Alternatively, the convex sector portion may be replaced with a concave sector for achieving a similar effect.

Further, in the embodiments of FIGS. 5 and 11 as described above, the concave and convex portions as well as the distance sensor as the signal generating means and the detection means may be replaced with a permanent magnet and a magnetic sensor, respectively, in principle. Further, as the sensor there may be utilized an ultrasonic or photo-sensor and the like.

Figures 4A, 4B:
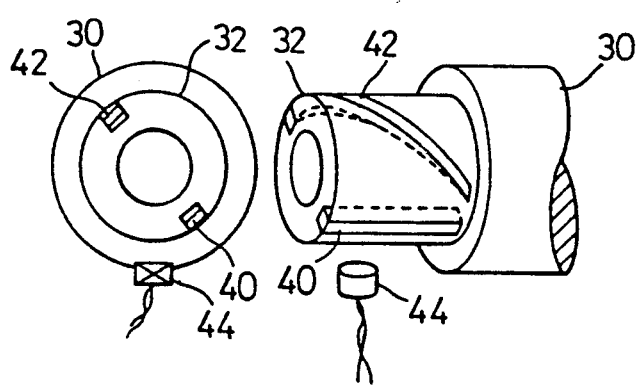

The embodiment of FIGS. 12 (a) and (b) is similar to that of FIG. 4, except that a surface of the end nut 32 is covered and sealed with a non-magnetic thin protecting cylinder 66 in order to protect the linear and helical permanent magnets 40 and 42. In such construction, the permanent magnets 40 and 42 may be protected from the surrounding atmosphere, resulting in the prolongation of their available life.

In embodiments of FIG. 13 as well as FIGS. 14 (a) and (b), the signal generating means consists of a rectilinear light source while the detection means consists of a photo-sensor. Namely, the end nut 32 at its main body is formed with a transparent block 68, a surface of which is coated with a shading membrane 70 and which is provided therein with a rectilinear light source 72. The shading membrane 70 is partially cut away and provided with two rectilinear axially inclined, convergent and light transmitting slits 74 and 76 to form a signal generating means, while a photo-sensor 78 is arranged in a position opposite to said slits.

In such construction, not only the radial abrasion of the bearing but also the degree and direction of the thrust abrasion may be detected as follows: when an output of the monitoring apparatus in the normal state of the bearing is in the state as shown in FIG. 14 (a), the thrust abrasion of the bearing and hence the displacement of the rotary shaft 30 by a distance N to the left, as shown in FIG. 14 (b), a time interval t between both pulse signals generated from the photo-sensor 78 corresponding to the transmitting slits 74, 76 is reduced from $t_1$ to $t_2$. Thus, the measurement of the time interval $t_1$, $t_2$ ... or the time ratio t/T allows simultaneous detection of the degree and the direction of the thrust abrasion of the bearing.

Figure 15:
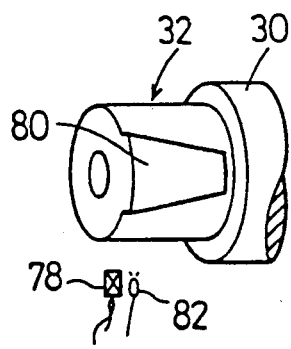
FIG. 15 is a perspective view of a further embodiment of the monitoring apparatus according to the invention, FIGS. 16 (a) and (b) are side views in the normal state and the thrust abrasion state, respectively, of the bearing of the monitoring apparatus as shown in FIG. 15.
Figure 16:
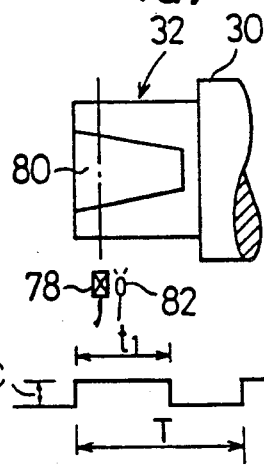
Figure 16:
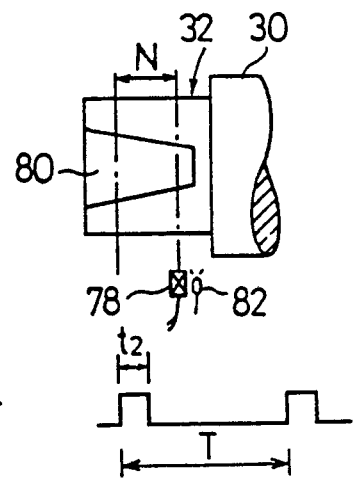

The embodiment of FIG. 15 and FIGS. 16 (a), (b) is different from that of FIGS. 13 and 14 (a), (b) in that the rectilinear light source as the signal generating means is replaced with a reflective plate and a light source. The signal generating means comprises a reflective plate 80 of a convex sector type with an axially varying width provided on a surface of the end nut 32 and a light source 82 arranged in a position opposite to said reflective plate 80 while a photo-sensor 78 is arranged adjacent to the light source 82. With such construction, it will be appreciated that the same effect may be achieved as in the embodiments of FIGS. 10, 11, 13 and 14, clearly understood with reference to the drawings.

Figure 17:
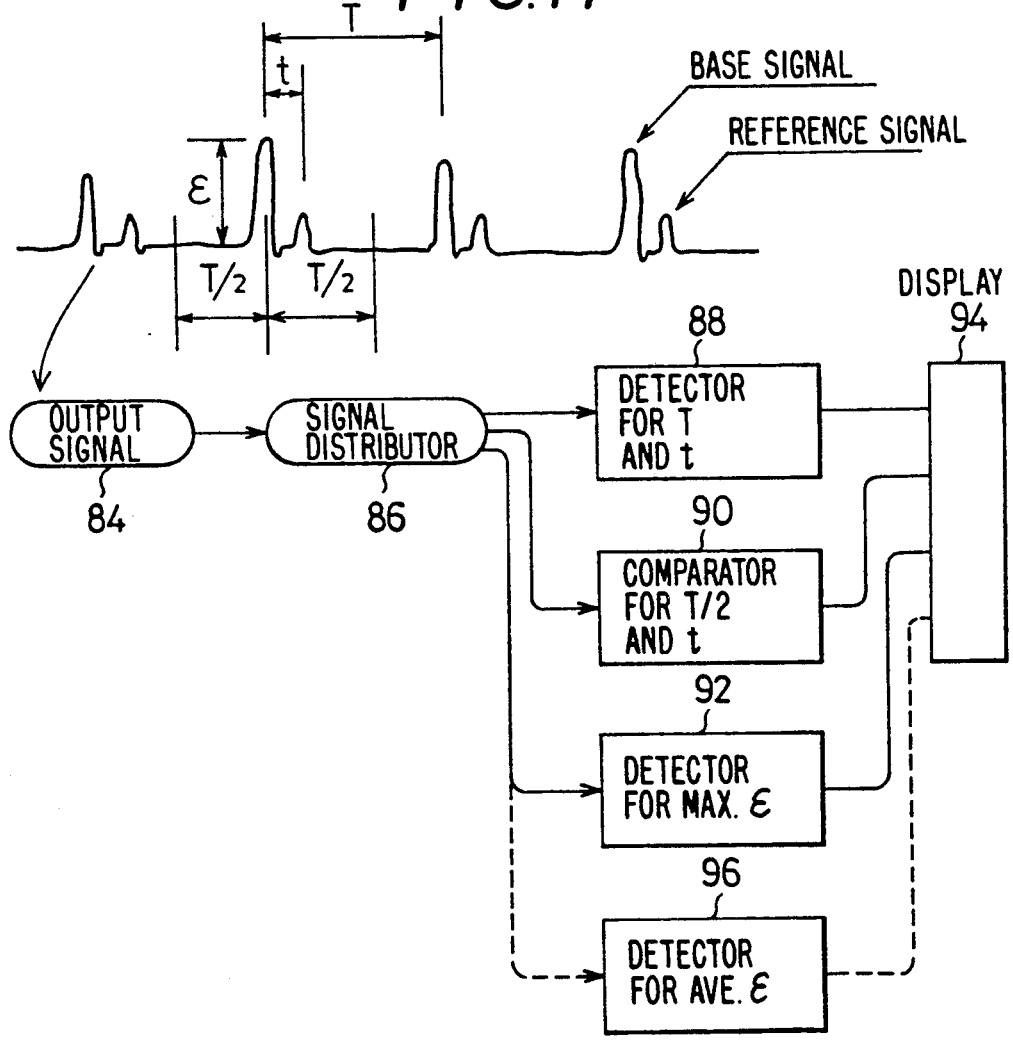
FIG. 17 is a flow sheet showing one embodiment of a signal treating device in the monitoring apparatus according to the invention.
Figure 18:
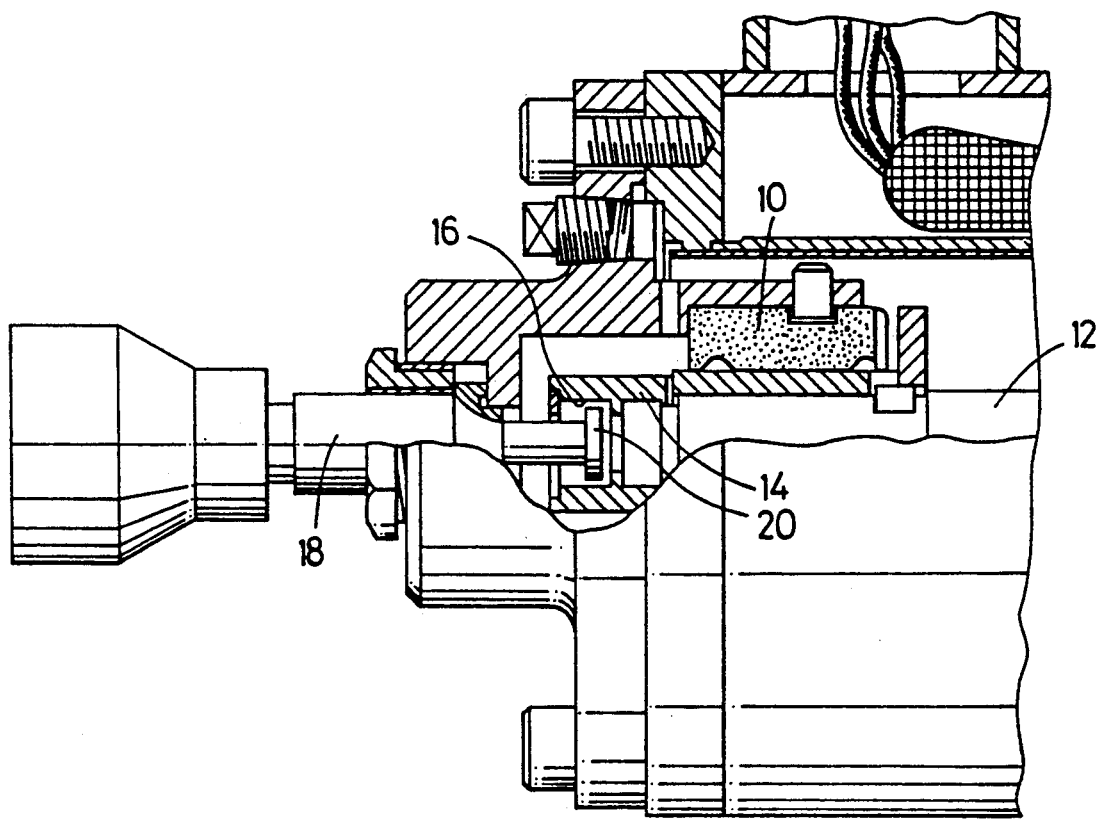
FIG. 18 is a partially cutaway sectional view of a conventional monitoring apparatus of the bearing.

Finally, one embodiment of a signal treating device is shown in FIG. 17. This embodiment relates to the monitoring apparatus of the bearing according to FIG. 5, or the signal treating device for the signal generating means compised of the higher rectilinear ridge 46 and the lower helical ridge 36 in which its output signal is illustrated for clockwise rotation [FIG. 5 (a)].

Referring to FIG. 17, the output signal 84 is input through a signal distributor 86 into a detector 88 for detecting the time interval t between the rotation cycle T and the base signal of the rotary shaft on one the hand and the reference signal on the other hand, a comparator 90 for comparing a time T/2 with t, and a detector 92 for detecting the maximum value of a signal amplitude E, and then its data is provided on a display 94. Thus, on the display 94 is displayed a position of the rotary shaft in its thrust direction, or the degree and the direction of the thrust abrasion of the bearing through the detector 88, while the rotating direction of the rotary shaft is displayed through the comparator 90, and the degree of the radial abrasion of the bearing is displayed through the detector 92. In place of or in addition to the detector 92, a detector 96 for detecting an average of the signal amplitude E may be arranged.

Although the invention has been described as to non-limiting embodiments for illustration only, it is to be understood that a number of modifications and variations may be made without departing from the scope and spirit of the invention. For example, both linear and helical ridges 34 and 36 may be arranged as in the transmitting slits 74 and 76 of FIG. 14.

What is claimed is:

1. Apparatus for monitoring the axial and radial wear on a bearing of a rotary shaft, comprising means supporting a said rotary shaft on a slide bearing for axial movement parallel to an axis of rotation of said shaft in said bearing, single detecting means to detect both an axially displaced position of said rotary shaft and a radially displaced position of said shaft, said single detecting means comprising fixed distance detecting means for detecting a distance between said distance detecting means and said shaft, thereby to detect radial displacement of said shaft, and for detecting, between two non-parallel contours on said shaft, a distance that varies lengthwise of said shaft, thereby to detect axial displacement of said shaft, said two non-parallel contours on said shaft comprising grooves recessed within a cylindrical side wall of a cylindrical recess in an end of said shaft, said single detecting means being fixedly mounted in spaced relation to said side wall on a fixed member disposed within said recess, and means responsive to the detection of said distances by said detecting means simultaneously to display said axial and radial positions of said shaft thereby to indicate axial and radial wear of said bearing.

* * * * *